(12) United States Patent
Jain et al.

(10) Patent No.: US 11,227,159 B2
(45) Date of Patent: Jan. 18, 2022

(54) EXPLANATORY VISUALIZATIONS FOR OBJECT DETECTION

(71) Applicant: Adobe Inc., San Jose, CA (US)

(72) Inventors: Rajiv Bhawanji Jain, Vienna, VA (US); Vlad Ion Morariu, Potomac, MD (US); Vitali Petsiuk, Boston, MA (US); Varun Manjunatha, College Park, MD (US); Ashutosh Mehra, Uttar Pradesh (IN); Vicente Ignacio Ordonez Roman, Charlottesville, VA (US)

(73) Assignee: Adobe Inc., San Jose, CA (US)

(*) Notice: Subject to any disclaimer, the term of this patent is extended or adjusted under 35 U.S.C. 154(b) by 54 days.

(21) Appl. No.: 16/876,540

(22) Filed: May 18, 2020

(65) Prior Publication Data

US 2021/0357644 A1  Nov. 18, 2021

(51) Int. Cl.
| | |
|---|---|
| *G06K 9/00* | (2006.01) |
| *G06K 9/62* | (2006.01) |
| *G06T 7/70* | (2017.01) |
| *G06T 11/00* | (2006.01) |
| *G06K 9/46* | (2006.01) |

(52) U.S. Cl.
CPC ....... *G06K 9/00671* (2013.01); *G06K 9/4671* (2013.01); *G06K 9/6215* (2013.01); *G06K 9/6267* (2013.01); *G06T 7/70* (2017.01); *G06T 11/00* (2013.01); *G06T 2200/24* (2013.01)

(58) Field of Classification Search
CPC ............. G06K 9/3241; G06K 2209/40; G06K 9/00201; G06K 9/3233; G06K 9/6273; G06Q 30/0603; G06Q 30/0631; G06Q 30/0643; G06T 7/60; G06T 7/75; G06T 7/90; G06T 229/2012; G06T 2219/2021; G06T 2219/2024
See application file for complete search history.

(56) References Cited

U.S. PATENT DOCUMENTS

2020/0273090 A1\* 8/2020 Ayush ...................... G06T 7/60

OTHER PUBLICATIONS

Antonio Torralba, Contextual priming for object detection. International Journal of Computer Vision, 53(2):169-191. 2003.
Aude Oliva and Antonio Torralba. The role of context in object recognition. Trends in cognitive sciences, 2007, 2007.
Adebayo, Julius, et al., "Sanity checks for saliency maps. In Advances in Neural Information Processing", Systems 31: Annual Conference on Neural Information Processing Systems 2018, NeurIPS 2018, Dec. 3-8, 2018, Montr 'eal, Canada., pp. 9525-9536.

(Continued)

*Primary Examiner* — Manuchehr Rahmjoo
(74) *Attorney, Agent, or Firm* — Keller Jolley Preece

(57) ABSTRACT

Introduced here are computer programs and associated computer-implemented techniques for creating visualizations to explain the outputs produced by models designed for object detection. To accomplish this, a graphics editing platform can obtain a reference output that identifies a region of pixels in a digital image that allegedly contains an object. Then, the graphics editing platform can compute the similarity between the reference output and a series of outputs generated by a model upon being applied to masked versions of the digital image. A visualization component can be produced based on the similarity.

20 Claims, 12 Drawing Sheets
(4 of 12 Drawing Sheet(s) Filed in Color)

(56) References Cited

OTHER PUBLICATIONS

Bach, Sebastian, et al., "On pixel-wise explanations for non-linear classifier decisions by layer-wise relevance propagation", PLOS ONE,10(7):1-46, 2015.

Bargal, Sarah Adel, et al., "Excitation backprop for rnns", In 2018 IEEE Conference on Computer Vision and Pattern Recognition, CVPR 2018, Salt Lake City, UT, USA, Jun. 18-22, 2018, pp. 1440-1449.

Bau, David, et al., "Network dissection: Quantifying interpretability of deep visual representations", In 2017 IEEE Conference on Computer Vision and Pattern Recognition, CVPR 2017, Honolulu, HI, USA, Jul. 21-26, 2017, pp. 3319-3332.7.

Biederman, Irving, et al., "Scene perception: Detecting and judging objects undergoing relational violations", Cognitive psychology, 14(2):143-177, 1982.

Brendel, Wieland, et al., "Approximating cnns with bag-of-local-features models works surprisingly well on magenet", International Conference on Learning Representations, 2019.

Dabkowski, Piotr, et al., "Real time image saliency for black box classifiers", In Advances in Neural Information Processing Systems 30: Annual Conference on Neural Information Processing Systems 2017, Dec. 4-9, 2017, Long Beach, CA, USA, pp. 6967-6976.

Everingham, M., et al., "The pascal visual object classes challenge: A retrospective", International Journal of Computer Vision, 111(1):98-136., Jan. 2015.

Fong, Ruth, et al., "Net2vec: Quantifying and explaining how concepts are encoded by filters in deep neural networks". In 2018 IEEE Conference on Computer Vision and Pattern Recognition, CVPR 2018, Salt Lake City, UT, USA, Jun. 18-22, 2018, pp. 8730-8738.

Girshick, Ross B., et al., "Rich feature hierarchies for accurate object detection and semantic segmentation", In 2014 IEEE Conference on Computer Vision and Pattern Recognition, CVPR 2014, Columbus, OH, USA, Jun. 23-28, 2014, pp. 580-587.

Gudovskiy, Denis A., et al., "Explain to fix: A framework to interpret and correct DNN object detector predictions", CoRR, abs/1811.08011, 2018.

Hoiem, Derek, et al., "Diagnosing error in object detectors", In Computer Vision—ECCV 2012—12th European Conference on Computer Vision, Florence, Italy, Oct. 7-13, 2012, Proceedings, Part III, pp. 340-353.

Huk, Dong, et al., "Multimodal explanations: Justifying decisions and pointing to the evidence", In 2018 IEEE Conference on Computer Vision and Pattern Recognition, CVPR 2018, Salt Lake City, UT, USA, Jun. 18-22, 2018, pp. 8779-8788.

Koh, Pang Wei, et al., "Understanding black-box predictions via influence functions", In Proceedings of the 34th International Conference on Machine Learning, ICML 2017, Sydney, NSW, Australia, Aug. 6-11, 2017, pp. 1885-1894.

Lai, Baisheng, et al., "Saliency guided end-toend learning for weakly supervised object detection", In Proceedings of the Twenty-Sixth International Joint Conference on Artificial Intelligence, IJCAI 2017, Melbourne, Australia, Aug. 19-25, 2017, pp. 2053-2059.

Lapuschkin, Sebastian, et al., "Unmasking clever hans predictors and assessing what machines really learn", CoRR, abs/1902.10178, 2019.

Law, Hei, et al., "Detecting objects as paired keypoints", In Computer Vision—ECCV 2018—15th European Conference, Munich, Germany, Sep. 8-14, 2018, Proceedings, Part XIV, pp. 765-781.

Lin, Tsung-Yi, et al., "Microsoft COCO: common objects in context", In Computer Vision—ECCV 2014—13th European Conference, Zurich, Switzerland, Sep. 6-12, 2014, Proceedings, Part V, pp. 740-755.

Liu, Wei, et al., "SSD: single shot multibox detector", In Computer Vision—ECCV 2016—14th European Conference, Amsterdam, The Netherlands, Oct. 11-14, 2016, Proceedings, Part I, pp. 21-37.

Morch, Niels J.S., et al., "Visualization of neural networks using saliency maps", In Proceedings of International Conference on Neural Networks (ICNN'95), Perth, WA, Australia, Nov. 27-Dec. 1, 1995, pp. 2085-2090.

Mottaghi, Roozbeh, et al., "The role of context for object detection and semantic segmentation in the wild", In 2014 IEEE Conference on Computer Vision and Pattern Recognition, CVPR 2014, Columbus, OH, USA, Jun. 23-28, 2014, pp. 891-898.

Olah, Chris, et al., "Feature visualization", Distill, 2(11):e7, 2017.

Paszke, Adam, et al., Automatic differentiation in PyTorch. In NIPS Autodiff Workshop, 2017.

Petsiuk, Vitali, et al., "RISE: randomized input sampling for explanation of black-box models", In British Machine Vision Conference 2018, BMVC 2018, Northumbria University, Newcastle, UK, Sep. 3-6, 2018, p. 151.

Ramanishka, Vasili, et al., "Top-down visual saliency guided by captions", In 2017 IEEE Conference on Computer Vision and Pattern Recognition, CVPR 2017, Honolulu, HI, USA, Jul. 21, 26, 2017, pp. 3135-3144.

Redmon, Joseph, et al., "An Incremental Improviement", CoRR, abs/1804.02767, 2018.

Ren, Shaoqing, et al., "Faster R-CNN: towards real-time object detection with region proposal networks", EEE Trans. Pattern Anal. Mach. Intell., 39(6):1137-1149, 2017.

Ribeiro, Marco Tulio, et al., ""why should I trust you?": Explaining the predictions of any classifier", In Proceedings of the 22nd ACM SIGKDD International Conference on Knowledge Discovery and Data Mining, San Francisco, CA, USA, Aug. 13-17, 2016, pp. 1135-1144.

Selvaraju, Ramprasaath R., et al., "Grad-cam: Visual explanations from deep networks via gradient-based ocalization". In IEEE International Conference on Computer Vision, ICCV 2017, Venice, Italy, Oct. 22-29, 2017, pp. 618-626.

Simonyan, Karen, et al., Deep inside convolutional networks: Visualising image classification models and saliency maps. In 2nd International Conference on Learning Representations, ICLR 2014, Banff, AB, Canada, Apr. 14-16, 2014, 2007.

Tsunakawa, Hideomi, et al., Contrastive relevance propagation for interpreting predictions by a single-shot object detector. In International Joint Conference on Neural Networks, IJCNN 2019 Budapest, Hungary, pp. 1-9, Jul. 2019.

Vondrick, Carl, et al., Visualizing object detection features. International Journal of Computer Vision, 119(2):145-158, 2016.

Wang, Fulton, et al., Causal falling rule lists.CoRR, abs/1510.05189, 2015.

Wilson, Benjamin, et al., Predictive inequity in object detection. CoRR, abs/1902.11097, 2019.

Zeiler, Matthew D., et al., Visualizing and understanding convolutional networks. In Computer Vision—ECCV 2014—13th European Conference, Zurich, Switzerland, Sep. 6-12, 2014, Proceedings, Part I, pp. 818-833.

Zhang, Jianming, et al., Top-down neural attention by excitation backprop. International Journal at Computer Vision, 126(10):1084-1102, 2018.

Zhou, Bolei, et al., Learning deep features for discriminative localization. In 2016 IEEE Conference on Computer Vision and Pattern Recognition, CVPR 2016, Las Vegas, NV, USA, Jun. 27-30, 2016, pp. 2921-2929, 2016.

\* cited by examiner

EXPLANATORY VISUALIZATIONS FOR OBJECT DETECTION

TECHNICAL FIELD

Various embodiments concern computer programs and associated computer-implemented techniques for creating visualization components to explain the outputs produced by models designed for object detection in a form suitable for human consumption.

BACKGROUND

Object detection is a challenging computer vision task that involves detecting the presence and location of semantic objects (or simply "objects") in digital images. To detect the objects in a digital image comprised of pixels, a computer-implemented model (or simply a "model") designed for object detection is applied to the pixels. Generally, the model is represented by a series of algorithms that are applied, either sequentially or simultaneously, to the pixels to detect features that are representative of objects. For example, if a model is designed to identify human faces, then the underlying algorithms may search for a pair of eyes that are proximate to one another and surrounded by pixels whose color corresponds to skin tones. As another example, if a model is designed to identify buildings, then the underlying algorithms may search for perpendicular corners connected to sides of roughly equal lengths.

Approaches to object detection are normally based on either machine learning (ML) or deep learning (DL). For ML-based approaches, it is necessary to define the features of the object to be detected and then employ a technique such as support vector machine (SVM) to perform the detection. Examples of ML-based approaches include the Viola-Jones framework, scale-invariant feature transform (SIFT), and histogram of oriented gradients (HOG). Since DL-based approaches are based on neural networks, object detection can be performed without specifically defining the features. Instead, the neural networks can simply learn which features are important over time. Examples of DL-based approaches include region-proposal based approaches, such as Region-Based Convolutional Neural Network (R-CNN) and Fast R-CNN, Single Shot MultiBox Detector (SSD), and You Only Look Once (YOLO). DL-based approaches have become increasingly popular due to the difficulty of explicitly or algorithmically defining the features of interest.

BRIEF DESCRIPTION OF THE DRAWINGS

This patent or application contains at least one drawing executed in color. Copies of this patent or application publication with color drawings will be provided by the Office upon request and payment of the necessary fee.

Figure 1A:
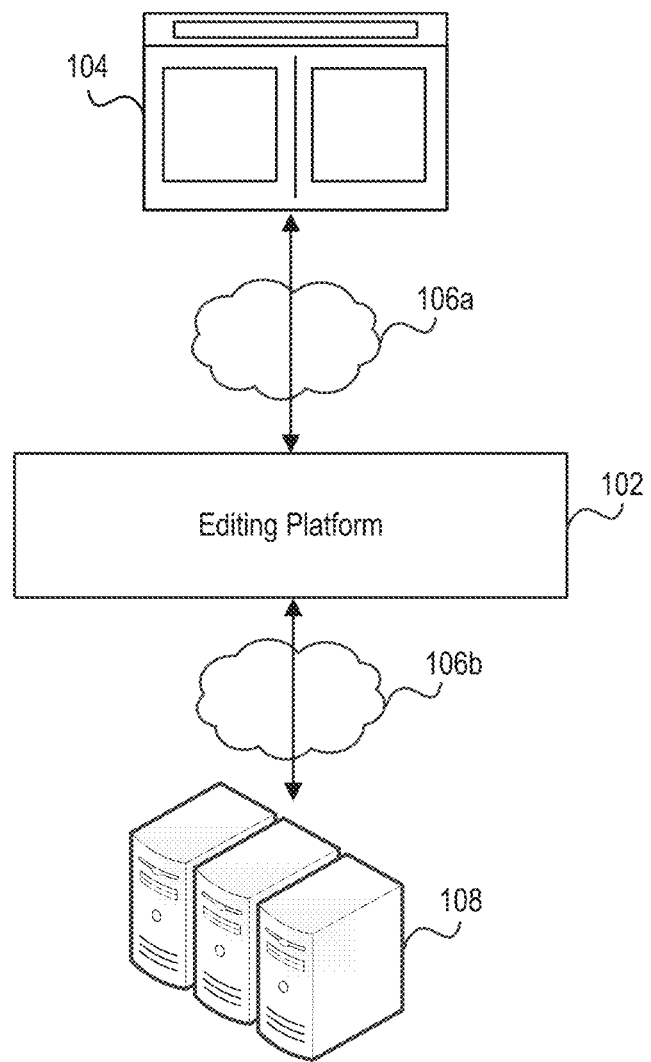
FIG. 1A illustrates a network environment that includes an editing platform.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The proliferation of digital images in recent years has led to many advancements in image processing. These advancements are particularly notable in scientific fields such as computer vision. At a high level, computer vision involves understanding the content of digital images to produce useful information (e.g., in the form of decisions or predictions). One technology that is useful in many domains of computer vision is object detection, where a model (also referred to as an "object detector") is applied to the pixels that constitute a digital image in order to detect objects in that digital image.

Each model is normally comprised of a series of algorithms that are trained to identify a single class of objects, such as humans, animals, buildings, vehicles, and the like. This series of algorithms may be referred to as a "neural network." To detect multiple classes of objects, multiple models (and thus multiple neural networks) could be applied to a digital image, either sequentially or simultaneously. For instance, multiple models could be applied to a digital image in order to detect objects in different classes. Alternatively, a multi-headed model comprised of multiple neural networks could be applied to the digital image.

Neural networks have become increasingly popular due to their ability to perform various computer vision tasks. However, it is difficult to understand how the outputs produced by neural networks can be attributed to the digital images that serve as the inputs. This is especially true for deep neural networks with multiple layers of algorithms.

While models designed for object detection have experienced significant gains in performance since the adoption of neural networks, the outputs produced by these models can be difficult to interpret. For instance, it is often unclear how a neural network established that a bounding box which allegedly contains an object was determined to be appropriate given the digital image that serves as the input. This, in turn, can make it difficult to identify why the neural network may have failed, what biases are exhibited by the neural network, etc. Simply put, the increasing complexity of the models used for object detection has made it difficult to explain their outputs in a comprehensible manner.

Introduced here, therefore, are computer programs and associated computer-implemented techniques for creating visualization components (also referred to as "visualizations") to explain the outputs produced by neural networks in a form suitable for human consumption. To accomplish this, a graphics editing platform (or simply "editing platform") may perform a process for producing visualizations that does not require any knowledge of the weights, gradients, or architectures of the neural networks. Such an approach ensures that the approaches described herein are readily applicable to neural networks with one- and two-stage architectural designs. Models with two-stage architectural designs include a proposal stage in which regions of interest (ROI) are selected followed by an extraction state in which each ROI is classified based on its features.

As further discussed below, the visualizations enable individuals to investigate the abilities implicitly learned by models that employ neural networks. This is beneficial in several respects. First, exploring spatial importance has historically been deemed redundant because it was assumed that models placed bounding boxes around all pixels deemed important. However, this assumption has been shown to be false. Neural networks may learn to utilize the surrounding pixels to determine whether an object is present. For instance, a neural network designed to identify sinks may search for other items, such as faucets or mirrors, that would be expected to be located nearby. The visualizations described herein can identify those surrounding pixels. Second, all pixels within a bounding box have historically been deemed equally important. This assumption has also been shown to be false. As further discussed below, the visualizations described herein are able to visually identify those regions that are more discriminant than others.

Note that while embodiments may be described in the context of network-based models for object detection, the approaches described herein do not require that the models used for object detection rely on neural networks. Instead, the approaches are sufficiently flexible that they can be applied to various kinds of models, including those that rely on more classical vision approaches to object detection, reinforcement learning, etc.

Embodiments may be described with reference to particular types of classes, models, computer programs, digital images, etc. However, those skilled in the art will recognize that these features are equally applicable to other types of classes, models, computer programs, digital images, etc. For example, embodiments may be described in the context of generating saliency maps that explain predictions made for two-dimensional digital images. However, features of these embodiments could be extended to three-dimensional digital images, such as those used in autonomous driving and medical applications. As another example, embodiments may be described in the context of an editing platform that employs a neural network with a two-stage architectural design, such as Faster R-CNN, to detect objects in digital images. However, features of these embodiments may be similarly applicable to editing platforms that employ neural networks with one-stage architectural designs, such as SSD and YOLO, to detect objects in digital images. Whether a neural network with a one- or two-stage architectural design is used may depend on the speed at which explanations should be produced. The approaches described herein are generally faster (e.g., by approximately 50 percent) when a neural network with a one-stage architectural design is employed.

Moreover, aspects of the technology can be embodied using special-purpose hardware (e.g., circuitry), programmable circuitry programmed with software and/or firmware, or a combination of special-purpose hardware and programmable circuitry. Accordingly, embodiments may include a machine-readable medium with instructions that, when executed, cause a computing device to perform a process for generating a series of masks, applying the series of masks to a digital image to produce masked versions of the digital image, applying a neural network to the masked versions of the digital image to produce predictions, establishing a degree of similarity between the predictions and a reference prediction (also referred to as a "ground truth"), and the generating a visualization based on the degree of similarity.

Overview of Editing Platform

FIG. 1A illustrates a network environment 100 that includes an editing platform 102 able to execute instructions for creating visualization components to explain the outputs produced by models that employ, for example, neural networks. As further discussed below, the editing platform 102 may be comprised of a series of modules operable to encode a reference output for a digital image into a target vector, apply a series of masks to the digital image to create masked versions of the digital image, apply a model to each masked version of the digital image to generate a series of outputs indicative of alleged instances of objects, encode the series of outputs into a series of proposal vectors, and compute pairwise similarity between the target vector and the series of proposal vectors. The term "module" refers broadly to software components, firmware components, and/or hardware components. Accordingly, aspects of the editing platform 102 could be implemented in software, firmware, and/or hardware.

As shown in FIG. 1A, individuals can interface with the editing platform 102 via an interface 104. An example of an editing platform 2 is a raster graphics editor through which individuals can view, create, or manipulate raster graphics. The editing platform 102 may be responsible for creating the interfaces through which these actions can be specified. Similarly, the editing platform 102 may be responsible for creating the interfaces through which an individual can request an explanation for why an object was detected in a digital image, specify preferences, etc.

In some embodiments, the digital image to be examined is created/modified through the editing platform 102. In other embodiments, the digital image to be examined is uploaded to the editing platform 102. For example, an individual may access the editing platform 102 and then select, via an interface generated by the editing platform 102, a digital image from a memory, cause a model designed for object detection to be applied to the digital image, and request an explanation for outputs, if any, produced by the model.

As noted above, the editing platform 102 may reside in a network environment 100. Thus, the editing platform 102 may be connected to one or more networks 106a-b. The network(s) 106a-b can include personal area networks (PANs), local area networks (LANs), wide area networks (WANs), metropolitan area networks (MANs), cellular networks, the Internet, etc. Additionally or alternatively, the editing platform 102 can be communicatively coupled to computing device(s) over a short-range communication protocol, such as Bluetooth® or near-field communication (NFC).

The interface 104 is preferably accessible via a web browser, desktop application, mobile application, and/or over-the-top (OTT) application. Accordingly, the interface 104 may be viewed on a personal computer, tablet computer, mobile phone, game console, music player, wearable electronic device (e.g., a watch or a fitness accessory), network-connected ("smart") electronic device, (e.g., a television or a home assistant device), virtual/augmented reality system (e.g., a head-mounted display), or some other electronic device.

Some embodiments of the editing platform 102 are hosted locally. That is, the editing platform 102 may reside on the computing device used to access the interface 104. For example, the editing platform 102 may be embodied as a desktop application executing on a personal computer. Other embodiments of the editing platform 102 are executed by a cloud computing service operated by Amazon Web Services® (AWS), Google Cloud Platform™, Microsoft Azure®, or a similar technology. In such embodiments, the editing platform 102 may reside on a network-accessible server system 108 comprised of one or more computer servers. These computer server(s) can include different types of data (e.g., digital images, bounding boxes, and labels), user information (e.g., profiles and credentials), and other assets.

Embodiments may be described in the context of network-accessible interfaces. However, those skilled in the art will recognize that the interfaces need not necessarily be accessible via a network. For example, a computing device may be configured to execute a self-contained computer program that does not require network access. Instead, the self-contained computer program may download assets (e.g., graphics, matching algorithms, and processing operations) at a single point in time or on a periodic basis (e.g., weekly, daily, or hourly).

Figure 1B:
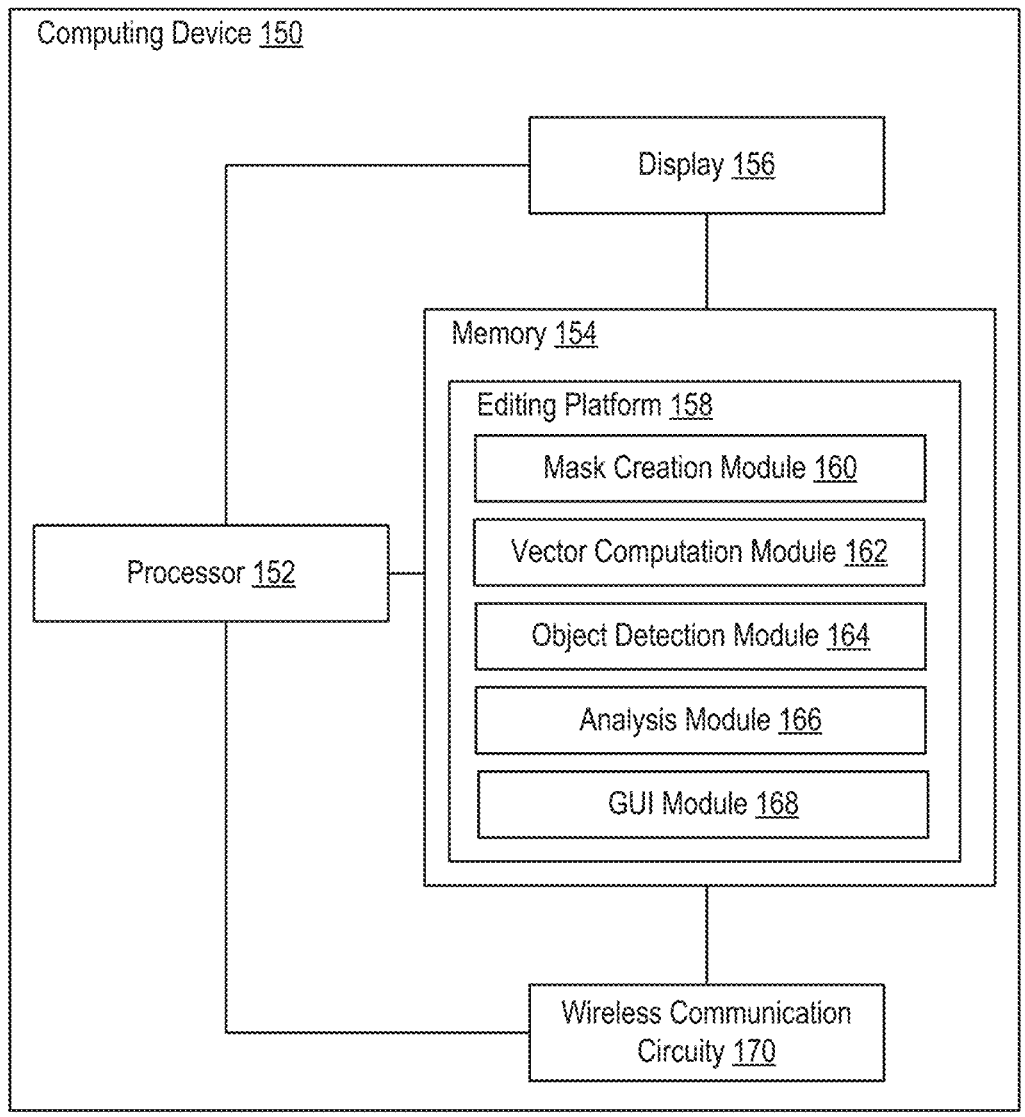
FIG. 1B illustrates an example of a computing device capable of implementing the techniques described herein.

FIG. 1B illustrates an example of a computing device 150 capable of implementing the techniques described herein. Note that the components shown in FIG. 1B are merely illustrative. Components that are well known are not shown for simplicity. Referring to FIG. 1B, the computing device 150 includes a processor 152, a memory 154, and a display 156. The computing device 150 may also include wireless communication circuitry 170 designed to establish wireless communication channels with other computing devices. The processor 152 can have generic characteristics similar to general-purpose processors, or the processor 152 may be an application-specific integrated circuit (ASIC) that provides arithmetic and control functions to the computing device 150. While not shown, the processor 152 may include a dedicated cache memory. The processor 152 can be coupled to all components of the computing device 150, either directly or indirectly, for data communication.

The memory 154 may be comprised of any suitable type of storage device including, for example, a static random-access memory (SRAM), dynamic random-access memory (DRAM), electrically erasable programmable read-only memory (EEPROM), flash memory, latches, and/or registers. In addition to storing instructions which can be executed by the processor 152, the memory 154 can also store data generated by the processor 152 (e.g., when executing the modules of the editing platform 158). Note that the memory 154 is merely an abstract representation of a storage environment. In some embodiments, the memory 154 is comprised of one or more actual memory chips or modules.

The display 156 can be, for example, a touch-enabled display or a non-touch-enabled display—in which case the computing device 150 likely also includes (or is connected to) an input device such as a keyboard.

The wireless communication circuitry 170 can form and/or communicate with a network for data transmission among computing devices, such as personal computers, mobile phones, and computer servers. The wireless communication circuitry 170 can be used for communicating with these computing devices or for connecting to a higher-level network (e.g., a LAN) or the Internet. Examples of wireless communication circuitry 170 include Bluetooth, Z-Wave, ZigBee, and the like. In some embodiments, the connection established by the wireless communication circuitry 170 can be bootstrapped by a near field communication (NFC) connection.

For convenience, the editing platform 158 may be referred to as a computer program that resides within the memory 154. However, as noted above, the editing platform 158 could be comprised of software, firmware, and/or hardware components implemented in, or accessible to, the computing device 150. In accordance with some embodiments of the techniques described herein, the editing platform 158 includes a mask creation module 160, a vector computation module 162, an object detection module 164, and an analysis module 166. Similar to the editing platform 158, each of these modules can be implemented via software, firmware, and/or hardware. As illustrated in FIG. 1B, these modules can be an integral part of the editing platform 158. Alternatively, these modules can be logically separate from the editing platform 158 but operate "alongside" it. Together, these modules may enable the editing platform 158 to programmatically explain a reference output (also referred to as a "detection" or "prediction") produced for a digital image by a model designed for object detection.

Initially, the editing platform 158 can obtain (i) a digital image comprised of pixels and (ii) a reference output that includes information regarding an object of detected in the digital image. In some embodiments the reference output is obtained by the object detection module 164 that applies a model to the digital image, while in other embodiments the reference output is obtained from the memory 154. Thus, the reference output need not necessarily be produced by the editing platform 158. The vector computation module 162 can then encode the reference output into a target vector (also referred to as a "reference vectors").

Thereafter, the object detection module 164 can identify a model associated with a class of which the object is a part. For example, if the reference output is a bounding box that is labeled as containing a vehicle, then the model may be designed to identify instances of vehicles in digital images. Generally, the object detection module 164 will identify the model from amongst a library of models corresponding to different classes. The library of models may be stored in the memory 154, or the library of models may be accessible to the editing platform 158 across a network (e.g., via a connection established by the wireless communication circuitry 170).

The mask creation module 160 may create a series of masks based on the digital image. This process is further discussed below with respect to FIG. 3. Moreover, the mask creation module 160 may apply the series of masks to the digital image to create masked versions of the digital image. In some embodiments, the masked digital images have identical dimensions as the original digital image. In other embodiments, the masks cause the masked digital images to be cropped with uniformly random offsets in either spatial direction. Thus, the masked digital images could include cropped (i.e., fully masked) regions along any of its sides.

The object detection module 164 can then apply the model to the masked digital images to generate a series of outputs indicative of separate instances of objects. Upon being applied to a masked digital image, the model may employ a neural network to detect instances, if any, of objects in the class. Generally, each masked digital image is associated with at least one instance of an object. Note, however, that the model could identify multiple instances of objects in a single masked digital image. Thus, each output in the series of outputs could be associated with a different masked digital image, or multiple outputs in the series of outputs could be associated with a single masked digital image. The vector computation module 162 can then encode the series of outputs into a series of proposal vectors.

Thereafter, the analysis module 166 can compute pairwise similarity between the target vector and the series of proposal vectors. More specifically, the analysis module 166 can compare the target vector and the series of proposal vectors so that for each proposal vector, a similarity metric is computed. The similarity metric for each proposal vector may be representative of the degree of similarity with the target vector based on a comparison of information encoded in those vectors.

The analysis module 166 may associate each similarity metric with a corresponding masked digital image. As discussed above, each similarity metric is associated with a proposal vector that encodes information regarding a proposed output produced by a model upon being applied to a masked digital image, and the analysis module 166 may assign each similarity metric to the appropriate masked digital image. Generally, each masked digital image is associated with at least one similarity metric. However, multiple similarity metrics could be assigned to a single masked digital image if multiple objects were detected in that masked digital image.

The analysis module 166 can assign the highest similarity metric to the corresponding mask as a weight metric. Accordingly, each mask will be associated with a weight metric that is indicative of the highest similarity metric calculated for objects, if any, detected in the corresponding masked digital image. Those skilled in the art will recognize that if no objects were detected in a masked digital image, then no similarity metrics will be assigned since no proposal vectors were created. In such instances, the corresponding mask can be assigned a weight metric of zero.

The analysis module 166 can then compute a weighted sum of the masks. Such an approach will cause each pixel in the digital image to be associated with a weighted sum of the corresponding elements in the series of masks. These values may be loaded into a matrix having the same dimensions as the digital image.

Other modules could also be included as part of the editing platform 158. For instance, a graphical user interface (GUI) module 168 may be responsible for generating the interfaces through which an individual can interact with the editing platform 158, view information indicative of the outputs produced by the aforementioned modules, etc. As an example, the GUI module 168 could produce a visualization component, such as a saliency map, based on the matrix of values computed by the analysis module 166, and then the GUI module 168 could post the visualization component to an interface presented on the display 156.

Model Interpretability

Several approaches have been proposed in an effort to retroactively provide interpretability to models following training.

One approach focuses on backpropagating scores indicative of importance through the layers of a neural network from an output to the pixels of the digital image that serves as the input. However, this approach is disadvantageous since the technique is closely tailored to the architecture of the model and requires that the model is differentiable. Since the backpropagation path depends on the architecture of the model, this approach cannot be readily implemented across different models with different architectures.

Another approach focuses on performing perturbations (e.g., inpainting, blurring, occluding) on regions of the digital image that serves as the input for a neural network. The importance of each region can be inferred based on the effect that a perturbation on those regions had on the output produced by the neural network. Since this approach can be extended across different architectures, it represents a more attractive option than the backpropagation approach.

Overview of Technology

Introduced here are editing platforms able to create visualizations to explain the outputs produced by models designed for object detection in a form suitable for human consumption. Assume, for instance, that an editing platform obtains a digital image (I) comprised of pixels, a model (f) designed to detect objects in a given class, and a reference output (d) that identifies a region of pixels (also referred to as a "bounding box") of the digital image that allegedly contains an object in the given class. Generally, the reference output (also referred to as the "target output") also includes a label (e.g., "human," "vehicle," "sink," or "giraffe") that identifies the class to which the object belongs. In such a scenario, the editing platform may wish to produce a saliency map (S) to explain the reference output. As further discussed below, the saliency map may be represented by a matrix of discrete values indicative of the salience of the pixels in the digital image in influencing the reference output.

In contrast to conventional approaches, the editing platform may be designed to solve this problem in a black-box manner. That is, the editing platform may attempt to produce the saliency map without needing access to the weights, gradients, or architecture of the model. For instance, the approaches described herein do not require that the model used for object detection is differentiable—unlike backpropagation-based approached—and thus can be applied to derive explanations for outputs produced by differentiable models and non-differentiable models. This approach is loosely inspired by the RISE approach described by Vitali Petisuk et al. in "RISE: Randomized Input Sampling for Explanation of Black-box Models," British Machine Vision Conference (2018). However, the perturbation concepts described therein are leveraged to explain object detection rather than image classification.

Figure 2:
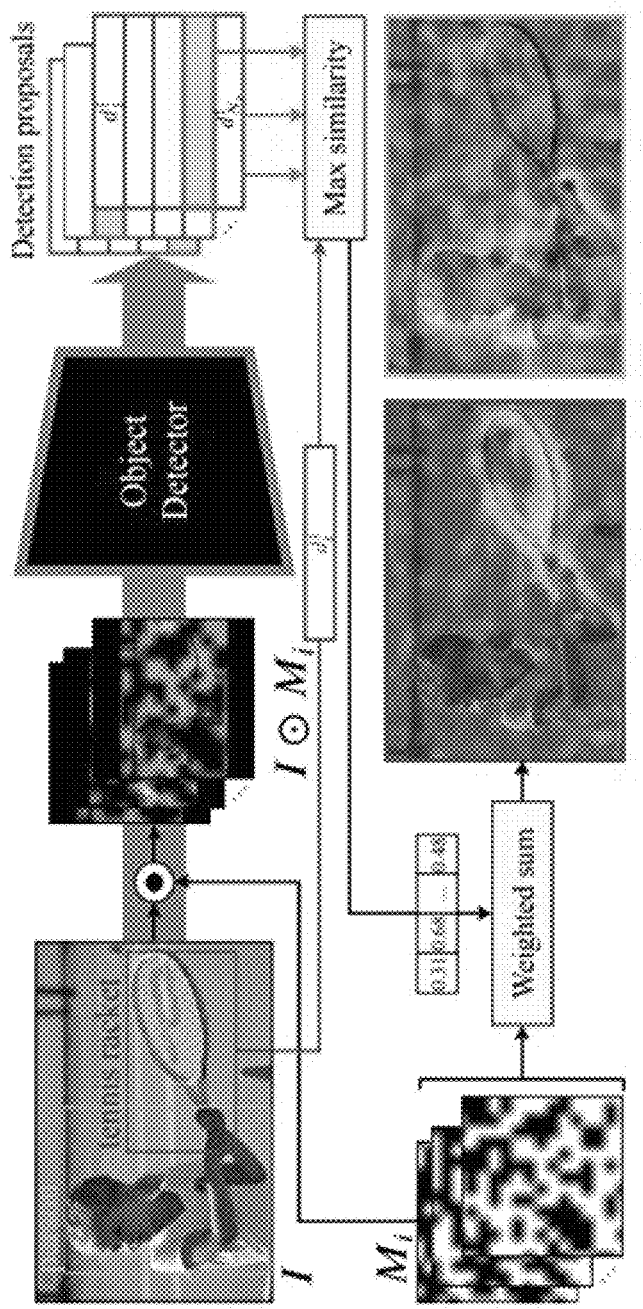
FIG. 2 includes a high-level illustration of a perturbation approach to explaining an output produced by a model designed for object detection.

The editing platform may attempt to measure the effect of perturbing (e.g., masking) regions of the digital image on the outputs produced by the model and then infers the importance of these regions based on the measured effects on the output. For instance, the editing platform may produce masked versions of the digital image and then apply the model to those masked versions to discover what effect, if any, such a perturbation had on the outputs (e.g., the bounding boxes) produced by the model. FIG. 2 includes a high-level illustration of this perturbation approach.

Initially, an editing platform can obtain a digital image along with one or more reference outputs. Here, the digital image is accompanied by two reference outputs, namely, a first bounding box labeled as containing a person and a second bounding box labeled as containing a tennis racket. The editing platform can then generate a series of masks that are applied to the digital image to produce masked versions of the digital image. Thereafter, the editing platform can apply a model to the masked versions of the digital image to produce a series of proposed outputs (also referred to as "detection proposals"). As further discussed below, each proposed output may be representative of a region of pixels that allegedly contains an object in the class the model is designed to detect.

Pairwise similarity can then be established between the reference output(s) and the series of proposed outputs. For instance, pairwise similarity may be computed so that for each reference output, a similarity metric is produced for each proposal output. The highest similarity metric associated with each masked version of the digital image can be assigned to the corresponding mask as a weight metric, and then a weighted sum of the series of masks can be computed. As shown in FIG. 2, the weighted sum of the series of masks may be represented as a saliency map that visually represents saliency of the corresponding reference output. The saliency maps may be useful in conveying how the reference outputs relate to the digital image. Here, for example, the first saliency map indicates that the handle of tennis racket was important in determining that a tennis racket is present, while the second saliency map indicates that the face and arm were important in determining that a person is present.

One drawback of randomized perturbation is that these approaches assume that the outputs produced by models are categorical. However, detection models are designed and then trained with regression objectives and, as such, do not simply categorize the digital image provided as input. To extend these approaches to detection models, the editing platform may incorporate additional data, such as localization information, classification information, and objectness scores, into the process by which visualizations are produced.

Many models, including Faster R-CNN and YOLO, are designed to propose a large number of bounding boxes representing possible instances of an object. To produce an output, these models refine those proposals using confidence thresholding and non-maximum suppression to leave a smaller number of bounding boxes. Thus, a model may ultimately generate a single output (e.g., a bounding box containing an object) despite initially identifying several possible instances of the object. An editing platform may denote bounding box proposals in the following manner:

$$d_i = [L^i, O^i, P^i]$$ Eq. 1

$$= [(x_1^i, y_1^i, x_2^i, y_2^i)^i, O^i, (p_1^i, \ldots, p_C^i)],$$ Eq. 2 where each bounding box proposal is encoded into a separate vector ($d_i$). As shown above, each vector may include localization information ($L^i$) that defines the corners ($x_1^i, y_1^i$) and ($x_2^i, y_2^i$) of the bounding box, an objectness score ($O^i \in [0,1]$) that represents the probability that the bounding box contains an object of any class, and classification information ($P^i$) that specifies the probabilities ($p_1^i, \ldots, p_C^i$) that the region of pixels within the bounding box belongs to each of a number of classes (C). For instance, the editing platform can construct a vector for a given bounding box by identifying the corners of the given bounding box, setting the objectness score to 1 to indicate that an object is contained therein, and then using a one-hot vector for the probabilities.

Now, given a digital image (I), a model (f) designed to detect objects in a given class, and a reference output (d) that defines a bounding box which contains an object in the given class, the editing platform can generate a saliency map that visually highlights the regions important for the model in predicting such a reference output. Note that the reference output need not necessarily have been produced by the model. For instance, the editing platform may obtain a reference output produced by another model ($f_2$) upon being applied to the digital image. In such instances, the saliency map may be treated as a high-level explanation for how features in the digital image could be analyzed. Said another way, if the reference output is provided by another model, the saliency map represents an explanation for what pixels would have been important in predicting the reference output, though that output may not actually have been predicted. However, if the reference output was produced by the model under consideration, then the saliency map may be treated as an explanation for how the dimensions of the bounding box were determined. The editing platform can measure the importance of pixels inside and outside the bounding box by observing the effect that perturbation of these pixels has on the model. At a high level, if perturbing a pixel (or a series of pixels) has a significant impact on the output produced by the model, then the pixel (or the series of pixels) is likely considered important by the model.

As noted above, detection models are designed and then trained with regression objectives unlike classification models. As such, detection models may not have a proposal that directly corresponds to the reference output, which could be an arbitrary bounding box. Instead, multiple bounding boxes may be proposed that overlap to varying degrees. Therefore, it is important that the editing platform determine not only how the disturbance in the output is measured but also where the disturbance is measured. To quantify the disturbance, the editing platform may produce similarity metrics (s) indicative of the pairwise similarity between a reference output and a series of proposed outputs representing. The reference output may be representative of the output produced by a model when applied to a digital image, and the series of proposed outputs may be representative of the outputs produced by the model when applied to a series of masked versions of the digital image.

The editing platform can infer the disturbance caused by each mask based on the similarity metrics. As further discussed below, the editing platform can select the proposed output with the highest pairwise similarity between a target vector (also referred to as the reference vector") associated with the reference output and all proposal vectors produced for a masked version of the digital image. Such an approach can be denoted in the following manner:

$$S(d_t, f(M_i \odot I)) \triangleq \max_{d_j \in f(M_i \odot I)} s(d_t, d_j),$$ Eq. 3 where S denotes the similarity between the target vector and all proposal vectors for a masked version of the digital image, $d_t$ denotes the reference output, $d_j$ denotes one of the proposed outputs, and $M_i \odot I$ denotes one of the masked versions of the digital image. Such an approach enables the editing platform to employ a masking technique to produce visualizations for explaining the decisions made by neural networks.

Mask Generation

Independently masking the pixels of a digital image may cause undesirable effects. To address these issues, the editing platform can sample smaller binary masks and then upsample those masks to larger resolution using bilinear interpolation. Following bilinear interpolation, the masks will no longer be binary but will have values in the range of [0,1].

Figure 3:
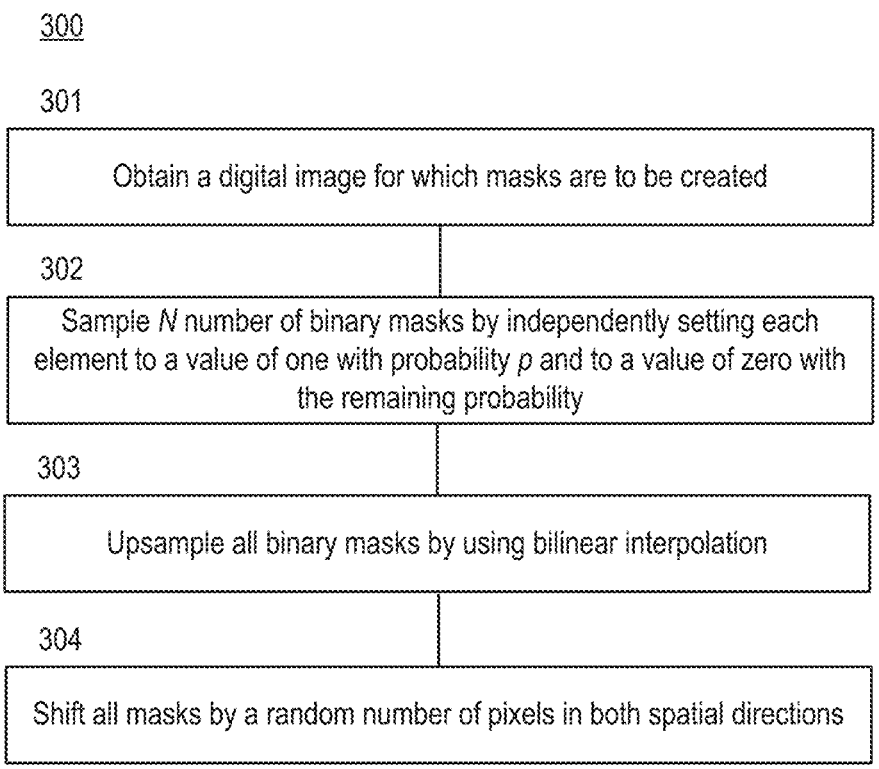
FIG. 3 depicts a flow diagram of a process for generating a set of masks.

FIG. 3 depicts a flow diagram of a process 300 for generating a set of masks. Initially, an editing platform can obtain a digital image for which masks are to be created (step 301). The digital image may be associated with a reference output for which an explanation is to be produced. As discussed above, the reference output may be representative of a bounding box identifying a region of pixels in the digital image.

The editing platform can sample N number of binary masks by independently setting each element to a value of one with probability p and to a value of zero with the remaining probability (step 302). Probability p is a predetermined value (e.g., 0.5, 0.7) that may be selected empirically. If probability p is large (e.g., greater than 0.7), then a greater number of masks will be needed to cover the entire digital image. Conversely, if probability p is small (e.g., less than 0.3), then much of the digital image will be lost and the editing platform may not be able to localize the saliency map. Accordingly, selecting an appropriate value for probability p is largely based on desired efficiency, coverage, etc. As an example, if probability p is set to 0.5, then each element has a 50 percent chance of being set to a value of one and a 50 percent chance of being set to a value of zero. Meanwhile, the number of binary masks (i.e., the value of N) may vary based on the desired level of confidence in the explanation, as well as the speed with which the process shown in FIG. 2 should be completed. If higher resolution of the saliency map is desired, then the number of binary masks may number in the thousands (e.g., 2,500, 5,000, 7,500). Conversely, if lower resolution is sufficient, then the number of binary masks may number in the tens or hundreds (e.g., 25, 100, 500). The dimensions of the masks, as defined by height (h) and width (w), are normally smaller than the dimensions of the digital image, as defined by height (H) and width (W).

Then, the editing platform can upsample all binary masks using bilinear interpolation (step 303). In particular, the editing platform can upsample all masks to size $(h+1)C_H \times (w+1)C_W$ using bilinear interpolation, where $C_H \times C_W = [H/h] \times [W/w]$ is the size of the cell in the upsampled mask. As noted above, the masks will no longer be binary following bilinear interpolation. Instead, each mask will be comprised of values in the range of [0,1].

To allow for more flexible masking, all masks may be shifted by a random number of pixels in both spatial directions (step 304). For instance, the editing platform may crop areas $H \times W$ with uniformly random offsets ranging from (0,0) to $(C_H, C_W)$.

Similarity Metrics

The editing platform may attempt to produce an explanation for a reference output associated with a digital image by computing the similarity between the reference output and a series of proposal outputs associated with masked versions of the digital image. To accomplish this, the editing platform can generate a similarity metric for each proposal vector based on its similarity to the target vector. As noted above, each vector (d) may include localization information (L), classification information (P), an objectness score (O), or any combination thereof. The similarity metrics may be based on the degree of similarity between each of these elements.

To measure spatial proximity, the editing platform can examine the Intersection over Union (IoU) of the bounding boxes encoded by a pair of vectors. This can be accomplished by comparing the localization information ($L^t$) encoded in the target vector ($d^t$) against the localization information ($L^j$) encoded in each proposal vector ($d^j$).

To measure how similar the regions defined by a pair of bounding boxes encoded by a pair of vectors appear to a neural network, the editing platform can examine the cosine similarities of the class probabilities associated with those regions. For instance, the editing platform may examine the cosine similarity of the classification information ($C^t$) encoded in the target vector ($d^t$) against the classification information ($C^j$) encoded in each proposal vector ($d^j$).

Finally, some neural networks output objectness scores, such as YOLO. For these neural networks, the editing platform can incorporate a measure of similarity between the objectness scores of a pair of vectors into the similarity metric. In some embodiments, the editing platform is designed to only explain high-confidence decisions (e.g., where the objectness score of the target vector is set to one since it represents a detection to be explained), so the objectness score ($O^t$) of the target vector could be incorporated into the similarity metric by simply multiplying it by the objectness score ($O^j$) of each proposal vector. Such an approach ensures that proposal vectors with lower objectness scores will have lower similarity with a high-confidence target vector. For neural networks that do not produce objectness scores, such as Faster R-CNN, the objectness term can be omitted.

Accordingly, the similarity metric between a target vector and a proposal vector can be decomposed into three factors as follows:

$$S(d_t, d_j) = s_L(d_t, d_j) \cdot s_P(d_t, d_j) \cdot s_O(d_t, d_j) \qquad \text{Eq. 4}$$

where $$s_L(d_t, d_j) = \text{IoU}(L^t, L^j) \qquad \text{Eq. 5}$$

$$s_P(d_t, d_j) = \frac{P^t \cdot P^j}{\|P^t\| \|P^j\|}, \text{ and} \qquad \text{Eq. 6}$$

$$s_O(d_t, d_j) = O^j. \qquad \text{Eq. 7}$$

Figure 4:
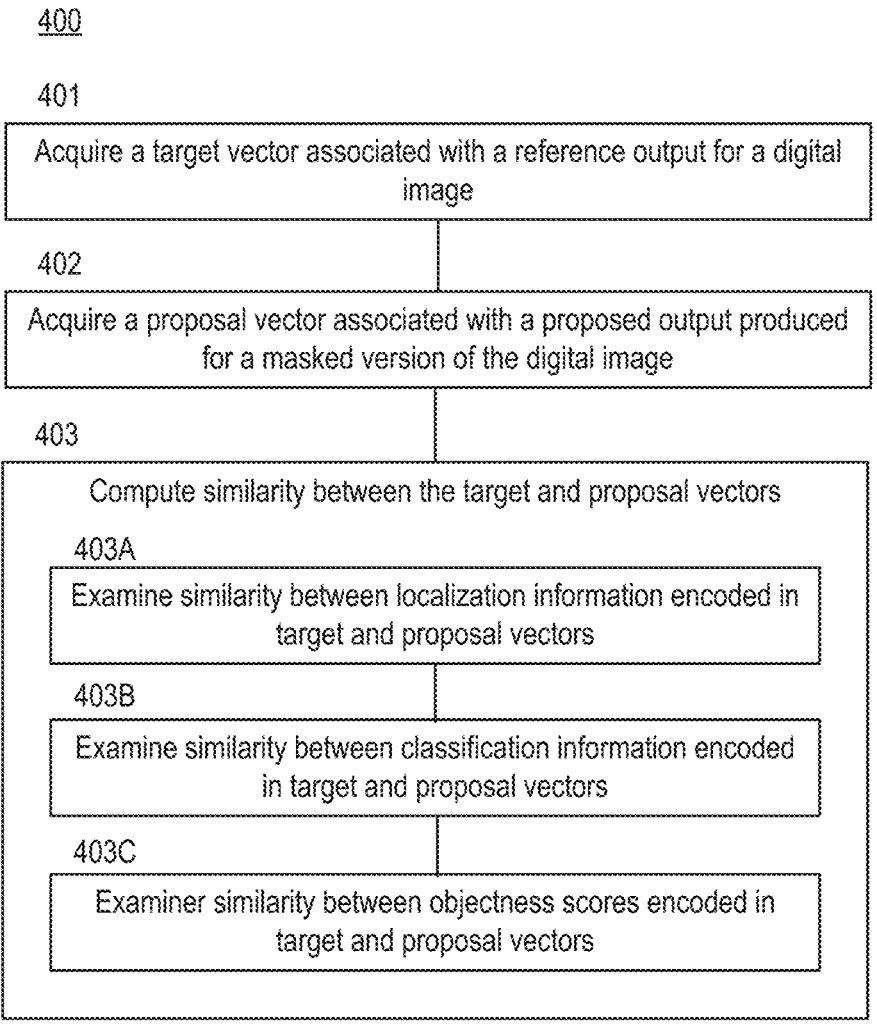
FIG. 4 depicts a flow diagram of a process for computing a similarity metric between a target vector and a proposal vector.

FIG. 4 depicts a flow diagram of a process 400 for computing a similarity metric between a target vector and a proposal vector. As noted above, the proposal vector may be one of many proposal vectors created by an editing platform, and a separate similarity metric can be produced for each of these proposal vectors. As such, multiple instances of the process 400 could be executed simultaneously or sequentially.

Initially, an editing platform can acquire a target vector ($d^t$) associated with a reference output for a digital image (step 401) and a proposal vector ($d^j$) associated with a proposed output produced for a masked version of the digital image (step 402). The reference output may be representative of a bounding box defining a region of pixels in the digital image for which an explanation is to be produced, while the proposed output may be representative of a bounding box defining a region of pixels in a masked version of the digital image. As further discussed below, the editing platform may create the target and proposal vectors itself, or the editing platform may obtain the target and proposal vectors from some other source (e.g., a memory having data structure with vectors stored therein).

At a high level, each vector represents a data structure that has been populated with information regarding the corresponding bounding box. As noted above, each vector include localization information (L), classification information (P), and/or an objectness score (O). Note that some vectors may include a subset of this information. For instance, the target and proposal vectors may not include objectness scores if the neural network that generated the reference and proposed outputs (i.e., the bounding boxes) does not produce objectness scores.

Then, the editing platform can compute similarity between the target and proposal vectors (step 403). Similarity may be represented as a metric that is based on the degree of similarity between the individual elements of the target and proposal vectors. For instance, the editing platform can examine the similarity between localization information encoded in the target and proposal vectors (step 403A), examine the similarity between classification information encoded in the target and proposal vectors (step 403B), or examine the similarity between objectness scores encoded in the target and proposal vectors (step 403C). Such an approach will result in the production of a similarity metric that is indicative of the degree of similarity between the reference output and the proposal output.

Methodologies for Algorithmically Inferring Salience

Using the pairwise similarity metrics for a target vector and a series of proposal vectors, an editing platform can generate a visualization that explains a reference output represented by the target vector. Assume, for instance, that an editing platform obtains a digital image (I) comprised of pixels, a model (f) designed to detect objects in a given class, and a reference output (d) that defines a region of pixels in the digital image that allegedly contains an object in the given class. Generally, the reference output takes the form of a bounding box that defines the perimeter of the region of pixels. In such a scenario, the editing platform may wish to produce a visualization to explain the reference output. One example of a visualization is a saliency map that visually indicates the importance of each pixel in the digital image in influencing the reference output.

Figure 5:
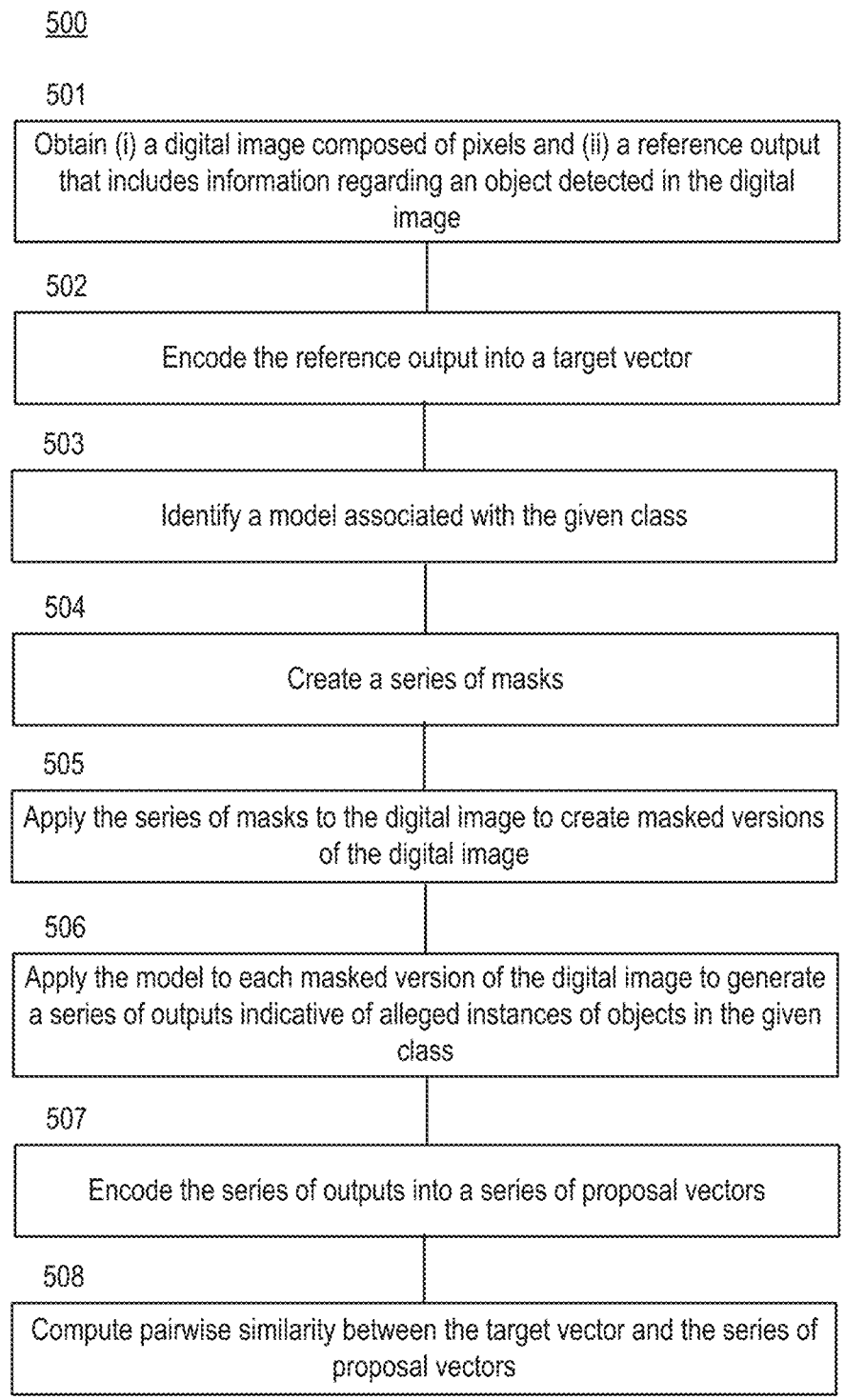
FIG. 5 depicts a flow diagram of a process for programmatically explaining a reference output (also referred to as a "detection" or "prediction") produced for a digital image by a model designed for object detection.

FIG. 5 depicts a flow diagram of a process 500 for programmatically explaining a reference output (also referred to as a "detection" or "prediction") produced for a digital image by a model designed for object detection. Initially, an editing platform can obtain (i) a digital image comprised of pixels and (ii) a reference output that includes information regarding an object of detected in the digital image (step 501). In some embodiments the editing platform obtains the reference output by applying a model to the digital image, while in other embodiments the editing platform obtains the reference output from a memory. Thus, the reference output need not necessarily be produced by the editing platform. The editing platform can then encode the reference output into a target vector (also referred to as a "reference vector") (step 502).

Thereafter, the editing platform can identify a model associated with a class of which the object is a part (step 503). For example, if the reference output is a bounding box that is labeled as containing a vehicle, then the model may be designed to identify instances of vehicles in digital images. Generally, the editing platform will identify the model from amongst a library of models corresponding to different classes.

The editing platform can create a series of masks (step 504) as discussed above with respect to FIG. 3. Then, the editing platform can apply the series of masks to the digital image to create masked versions of the digital image (step 505). In some embodiments, the masked digital images have identical dimensions as the original digital image. In other embodiments, the masks cause the masked digital images to be cropped with uniformly random offsets in either spatial direction. Thus, the masked digital images could include cropped (i.e., fully masked) regions along any of its sides. In FIG. 2, for example, the masked digital images include cropped regions along the top and bottom sides.

The editing platform can apply the model to the masked digital images to generate a series of outputs indicative of separate instances of objects (step 506). Upon being applied to a masked digital image, the model may employ a neural network to detect instances, if any, of objects in the class. Generally, each masked digital image is associated with at least one instance of an object. Note, however, that the model could identify multiple instances of objects in a single masked digital image. Thus, each output in the series of outputs could be associated with a different masked digital image, or multiple outputs in the series of outputs could be associated with a single masked digital image. The editing platform can then encode the series of outputs into a series of proposal vectors (step 507).

Thereafter, the editing platform can compute pairwise similarity between the target vector and the series of proposal vectors (step 508). More specifically, the editing platform can compare the target vector and the series of proposal vectors so that for each proposal vector, a similarity metric is computed. The similarity metric for each proposal vector may be representative of the degree of similarity with the target vector based on a comparison of information encoded in those vectors.

Figure 6:
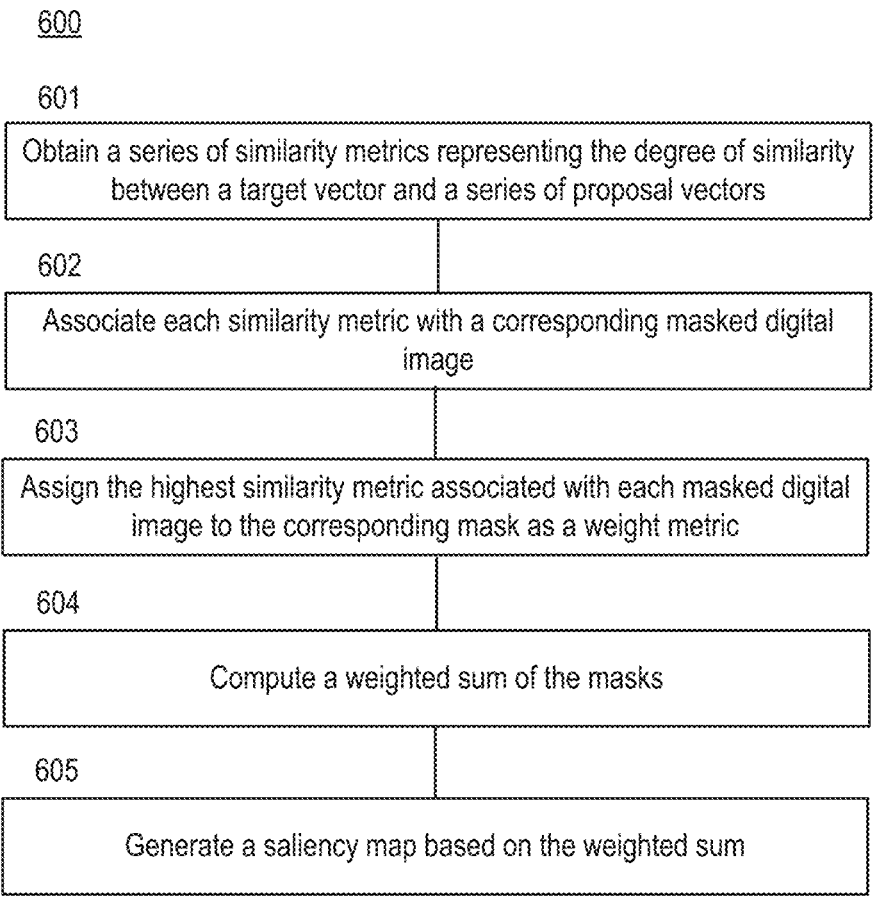
FIG. 6 depicts a flow diagram of a process for generating a visualization (here, a saliency map) that explains why a reference output was produced for a digital image.

FIG. 6 depicts a flow diagram of a process 600 for generating a visualization (here, a saliency map) that explains why a reference output was produced for a digital image. Initially, an editing platform can obtain a series of similarity metrics representing the degree of similarity between a target vector and a series of proposal vectors (step 601). These similarity metrics may have been produced by the editing platform as discussed above with respect to FIG. 5.

Then, the editing platform can associate each similarity metric with a corresponding masked version of the digital image (step 602). Each similarity metric is associated with a proposal vector that encodes information regarding a proposed output produced by a model upon being applied to a masked digital image, and the editing platform may assign each similarity metric to the appropriate masked digital image. Generally, each masked digital image is associated with at least one similarity metric. However, multiple similarity metrics could be assigned to a single masked digital image if multiple objects were detected in that masked digital image.

For each masked digital image, the editing platform can assign the highest similarity metric to the corresponding mask as a weight metric (step 603). Accordingly, each mask will be associated with a weight metric that is indicative of the highest similarity metric calculated for objects, if any, detected in the corresponding masked digital image. Those skilled in the art will recognize that if no objects were detected in a masked digital image, then no similarity metrics will be assigned since no proposal vectors were created. In such instances, the corresponding mask can be assigned a weight metric of zero.

The editing platform can then compute a weighted sum of the masks (step 604). Such an approach will cause each pixel in the digital image to be associated with a weighted sum of the corresponding elements in the series of masks. The weighted sum for a given pixel in the digital image could be denoted as follows: $w_1M_1+w_2M_2+ \ldots w_NM_N$. These values may be loaded into a matrix having the same dimensions as the original digital image.

The editing platform can generate a saliency map based on the weighted sum (step 605). More specifically, the editing platform can generate a saliency map by establishing, on a per-pixel basis, importance of the digital image based on the values in the matrix. In some embodiments, the editing platform applies a thresholding technique so that important pixels (i.e., those corresponding to higher values in the weighted sum) are rendered in one color while less important pixels (i.e., those corresponding to lower values in the weighted sum) are rendered in another color. For example, the editing platform may establish the importance of each pixel in the digital image by comparing a corresponding value in the matrix to defined ranges of values and then assign a color to each pixel based on the defined range of values in which the corresponding value is included. As another example, the editing platform may sort the values in the matrix into groups (e.g., based on natural breaks, or based on a defined number of values per group) and then assign the same color to all pixels in each group. Generally, the saliency map includes multiple colors that visually represent different levels of important. In FIG. 2, for example, the saliency maps include pixels rendered in red, orange, yellow, green, and blue depending on saliency.

Figure 7:
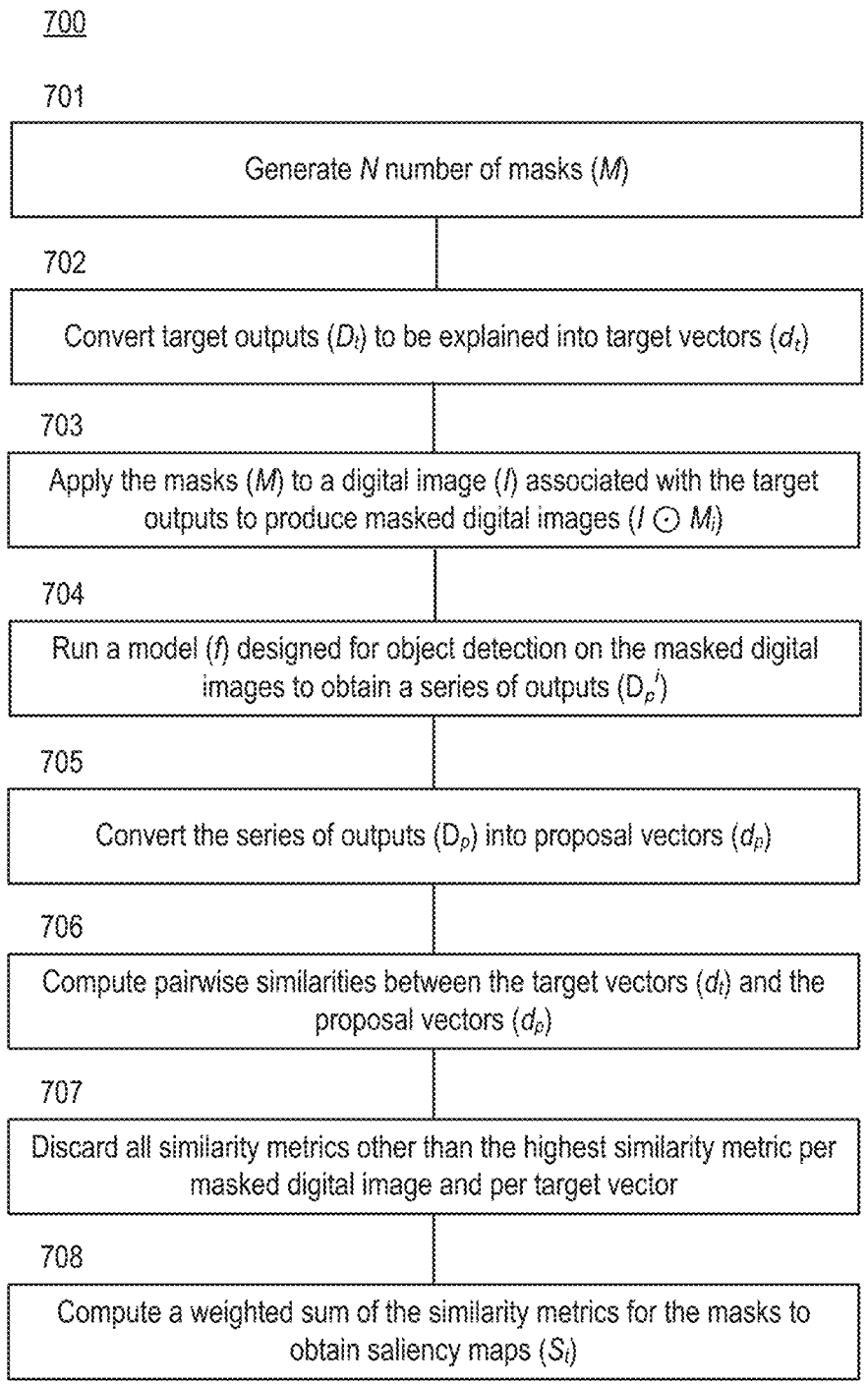
FIG. 7 depicts a flow diagram of another process for generating saliency maps for explaining predictions made by models without needing access to the weights, gradients, or architectures of those models.

FIG. 7 depicts a flow diagram of another process 700 for generating saliency maps for explaining predictions made by models without needing access to the weights, gradients, or architectures of those models. Initially, an editing platform can generate N number of masks ($M_i$, ..., n) having shape H×W (step 701). As discussed above, the editing platform can convert one or more outputs (also referred to as "detections" or "predictions") to be explained into target vectors ($d_t$) (step 702). In many instances, the editing platform will be interested in explaining a single output, so a single target vector will be created. However, in some instances, the editing platform will be interested in explaining multiple outputs. In FIG. 2, for example, the editing platform is interested in explaining a first bounding box labeled as containing a person and a second bounding box labeled as containing a tennis racket.

The editing platform can apply the masks ($M_i$, ..., n) to a digital image (I) associated with the outputs converted into the target vectors to produce masked digital images (I⊙$M_i$, ..., n) (step 703). Moreover, the editing platform can run a model (f) designed for object detection on these masked digital images to obtain a series of outputs ($D_p$) (step 704), and the series of outputs can be converted into a series of proposal vectors ($d_p$) (step 705). The proposal vectors may be encoded such that they have similar information as the target vectors.

The editing platform can then compute pairwise similarity between the target vectors ($d_t$) and proposal vectors ($d_p$) (step 706). More specifically, the editing platform may compare the target and proposal vectors so that for each pair of vectors, a similarity metric is produced. Such an approach will ensure that each proposal vector has a similarity metric for each target vector. Then, the editing platform may discard all similarity metrics other than the highest similarity metric per masked digital image and per target vector (step 707). Said another way, for each target vector, the editing platform may retain only the highest similarity score for each masked digital image.

These similarity scores can be assigned to the corresponding masks as weights ($w_i$) such that a weight metric is associated with each mask for each target output. As discussed above, if the model detects a single object in a given class in a masked digital image, then the similarity metric associated with the corresponding proposal vector will be the highest by default. However, there may be instances in which the model detects multiple objects in the given class. In such a scenario, the editing platform will only retain the highest similarity metric.

The editing platform can then compute a weighted sum of the similarity metrics for the masks to obtain saliency maps ($S_t$) (step 708). Such an approach can be denoted as follows:

$$S_t = \sum_{i=1}^{N} w_i^t M_i. \qquad \text{Eq. 8}$$

Such an approach results in a separate saliency map for each target output.

Figure 8:
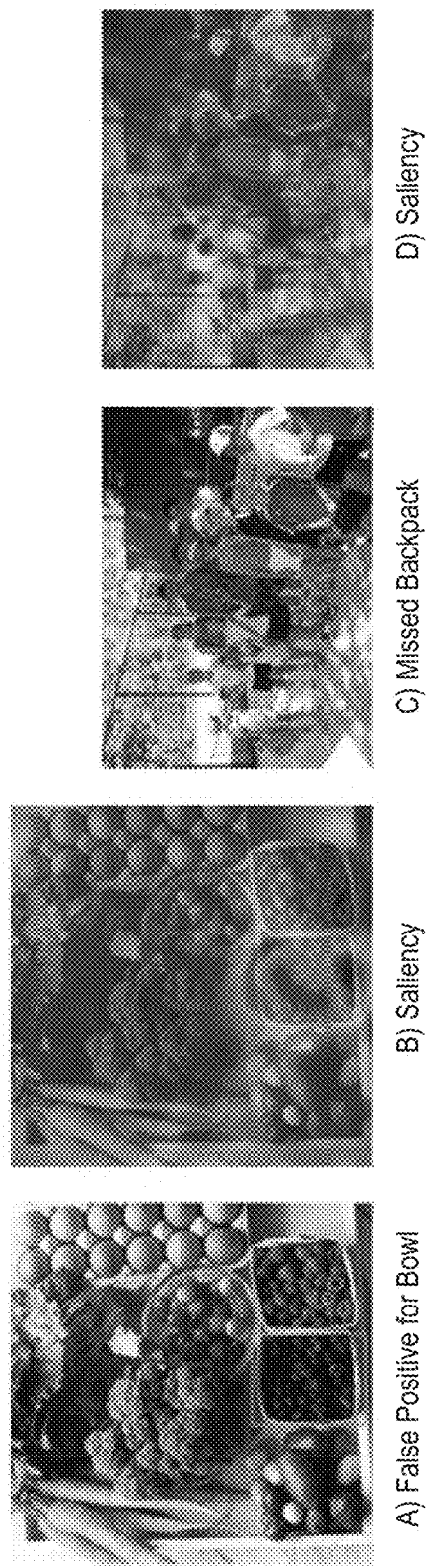
FIG. 8 includes several examples of explanations generated for missed detections (also referred to as "false negative detections") and false positive detections.

Generally, each saliency map is posted to an interface for review by an individual. In some embodiments the saliency maps are displayed by themselves, while in other embodiments the saliency maps overlay the digital image that includes the target outputs. Additionally or alternatively, the saliency maps may be aligned with the digital image. Examples are shown in FIG. 8, in which a digital image with its bounding box is arranged adjacent to a saliency map that overlays another instance of the digital image. In some embodiments, the saliency map overlays a modified version of the digital image in which the hue, intensity, or color format has been altered. For example, the editing platform may overlay the saliency map on a partially transparent version of the digital image to improve clarity.

All of these operations, including the similarity computation, can be performed using efficient calls to the vectorized functions of whatever framework is being used by the editing platform. Examples of such functions include tensor multiplication, maximum along axis, and weighted sum along axis.

Unless contrary to physical possibility, it is envisioned that the steps described above may be performed in various sequences and combinations. For instance, the editing platform may simultaneously execute multiple instances of the process 500 of FIG. 5 in order to generate explanations for multiple reference outputs. As an example, an individual may wish to produce explanations for multiple objects detected in a single digital image, such as the person and tennis racket in FIG. 2.

Other steps may also be included in some embodiments. For example, the editing platform may receive input specifying the number of binary masks to be produced. As another example, the editing platform may receive input selecting the model to be applied to the masked digital images. For instance, the individual may be permitted from a library of models having different architectures, associated with different classes, etc.

Experimental Results and Modes of Failure

At a high level, the errors of a model designed for object detection can be categorized into the following modes of failure: (1) missing an object entirely; (2) detecting an object with poor localization; and (3) proper localization but misclassification of an object. The approaches described herein can be used to analyze each of these errors.

Since the approaches described herein explanations to be provided not only for detections made by a model but also any arbitrary detection vector, the editing platform can compute saliency for a missed ground-truth detection vector. This may provide an insight into the source of error for missed detections. For example, parts of a digital image highlighted by a saliency map may still considered to be discriminative features even though the model did not detect the object, and the failure may have occurred while processing these features (e.g., in the non-maximum suppression step). On the other hand, the saliency map may not identify any relevant regions when the object is not recognized at all. Such an outcome suggests that the features of the object may not have been learned by the model yet. FIG. 8 includes several examples of explanations generated for missed detections (also referred to as "false negative detections") and false positive detections. In Example D, the saliency map shows that even though the backpack was missed, the model still considered the straps discriminatory.

Figure 9:
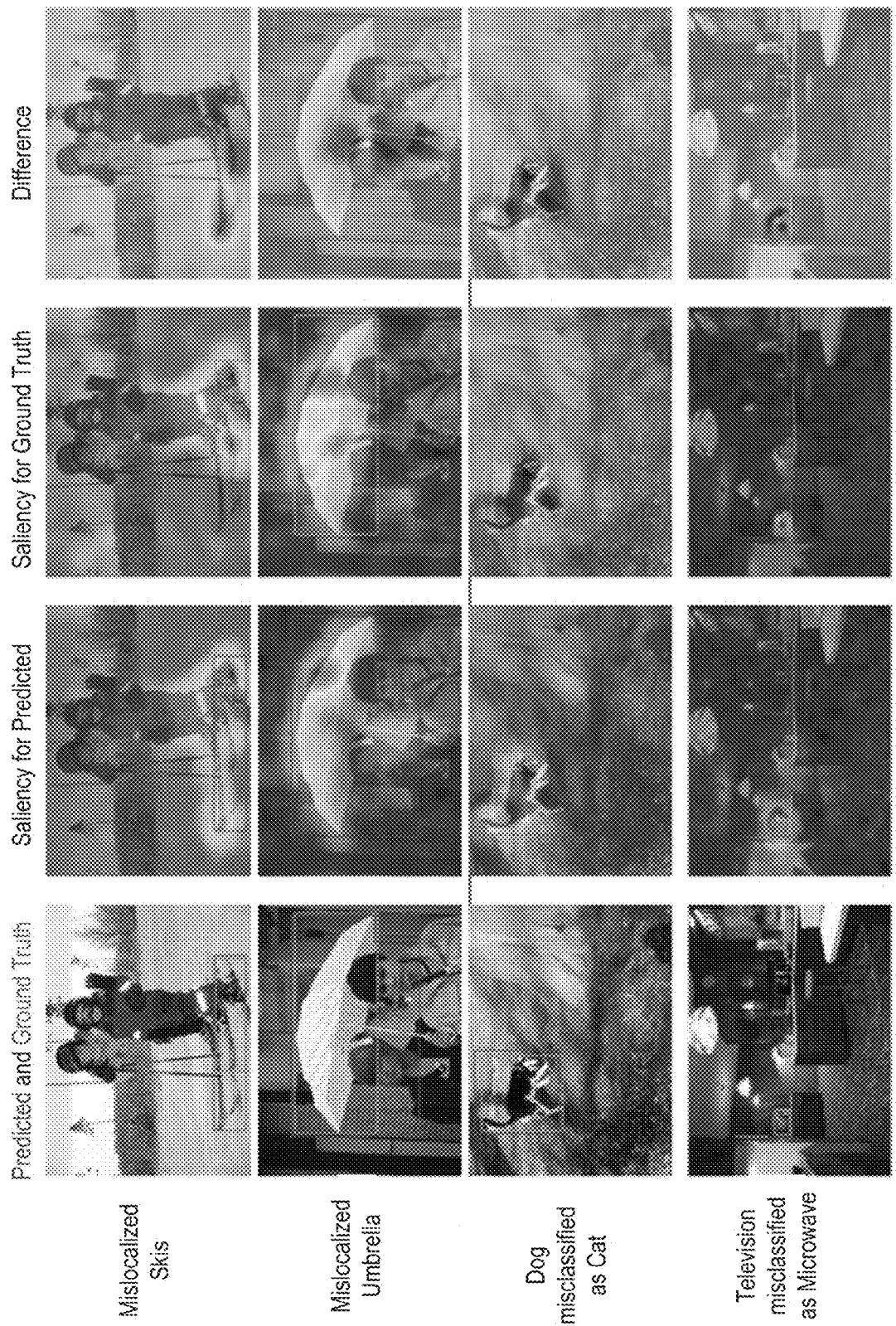
FIG. 9 includes several examples of explanations for poor localization and misclassification.

For a correctly localized but misclassified region (or a correctly classified but poorly localized region), the editing platform can generate saliency maps for the ground truth and predicted detections. By separately and collectively analyzing these saliency maps, parts of the digital image that contributed to the error can be identified. FIG. 9 includes several examples of explanations for poor localization and misclassification. In the second and third columns, the red regions may be interpreted as the regions supporting the boxes. In the fourth column, the red regions indicate where the model focused more than it should have while the blue regions indicate where the model did not focus enough. Here, for example, the first row illustrates that the model was unable to distinguish two pairs of skis, and the differences in the saliency maps indicate that the second pair of skis caused the bounding box to be erroneously extended. As another example, the last row illustrates how the television was misclassified as a microwave due to its surrounding context.

Figure 10:
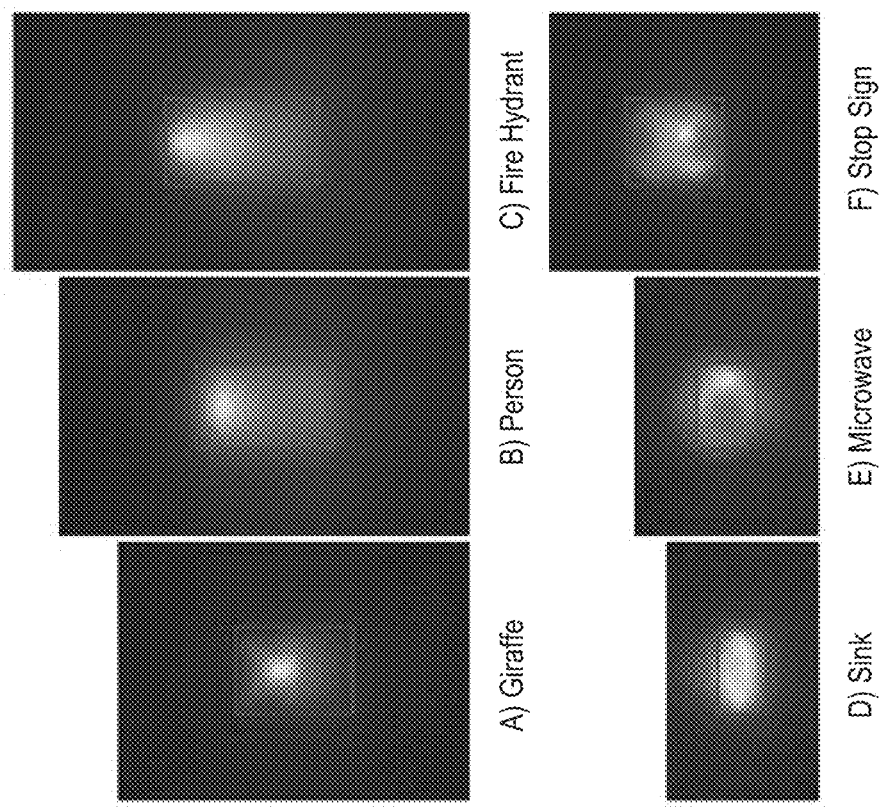
FIG. 10 includes examples of saliency maps for several Microsoft Common Objects in Context (COCO) classes that were cropped, aligned, and averaged for all predictions.

To transition from individually analyzing saliency maps as explanations of detections made by models to a more holistic approach of identifying patterns in model behavior, the editing platform may compute average saliency maps for each class in a given dataset. One example of such a dataset is the Microsoft Common Objects in Context (COCO). In particular, the editing platform may obtain all occurrences of the class detected by a model and then crop those occurrences with the surrounding context. The editing platform can normalize/resize to the average size computed per category and then compute those averages. FIG. 10 includes examples of saliency maps for several COCO classes that were cropped, aligned, and averaged for all predictions.

Figure 11:
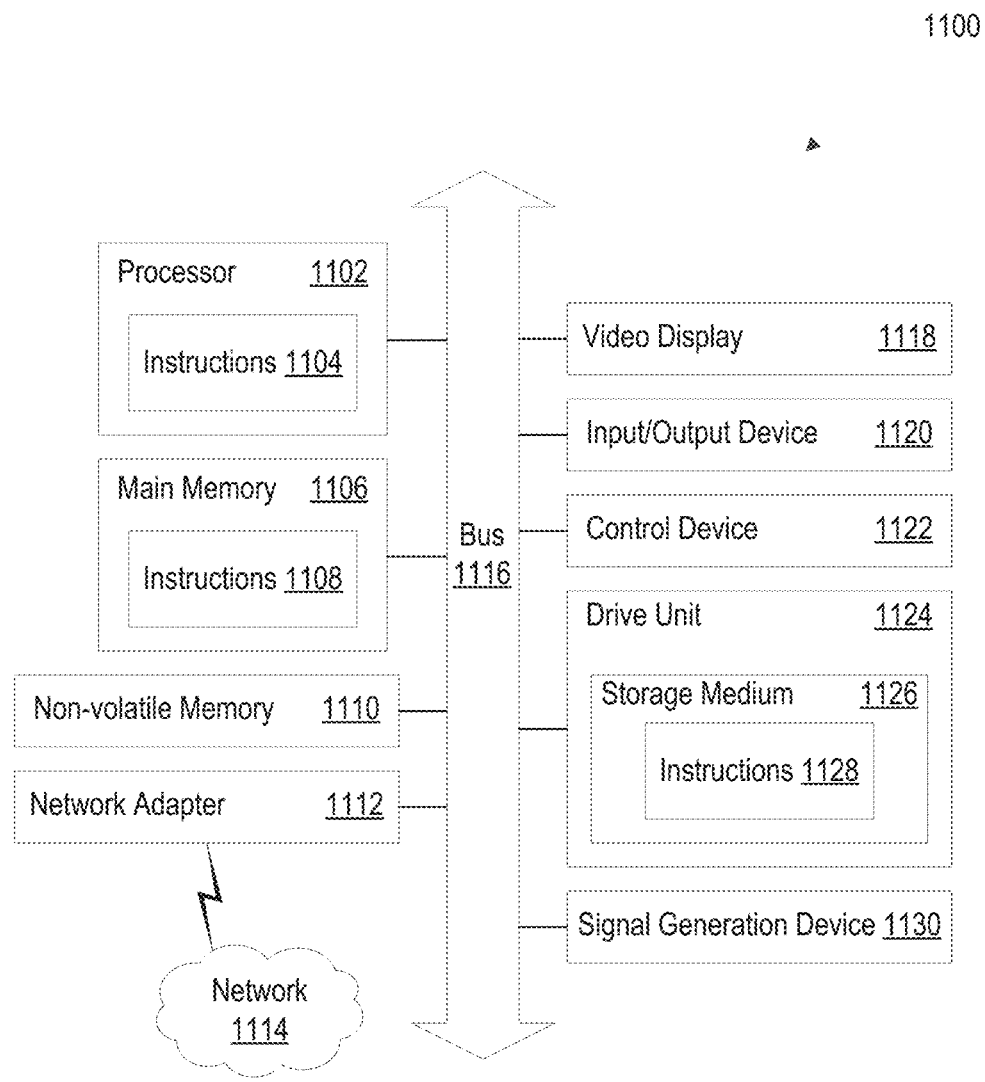
FIG. 11 is a block diagram illustrating an example of a computing system in which at least some operations described herein can be implemented.

By employing these approaches, an individual may be able to observe patterns in how models generate predictions. For instance, the individual may observe that some parts of objects are consistently more important than others, while saliency may be more evenly spread across the entire object in other cases. For example, the upper parts of the human body are normally more salient for detecting a person as shown in Example B of FIG. 10. Similarly, the upper parts of the fire hydrant are normally more salient for detecting its presence as shown in Example C of FIG. 10. Moreover, the individual may observe that average saliency may be relatively high outside of the bounding boxes for some classes. This signifies that the model is using more of the surrounding context for detecting these classes. For example, it may be retrospectively evident that a model designed to identify sinks considers nearby items (e.g., faucets and mirrors) when making its predictions as shown in Example D of Figure Computing System FIG. 11 is a block diagram illustrating an example of a computing system 1100 in which at least some operations described herein can be implemented. For example, some components of the computing system 1100 may be hosted on a computing device that includes an editing platform (e.g., the editing platforms 102, 158 of FIGS. 1A-B).

The computing system 1100 may include one or more central processing units (also referred to as "processors") 1102, main memory 1106, non-volatile memory 1110, network adapter 1112 (e.g., network interface), video display 1118, input/output devices 1120, control device 1122 (e.g., keyboard and pointing devices), drive unit 1124 including a storage medium 1126, and signal generation device 1130 that are communicatively connected to a bus 1116. The bus 1116 is illustrated as an abstraction that represents one or more physical buses and/or point-to-point connections that are connected by appropriate bridges, adapters, or controllers. The bus 1116, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The computing system 1100 may share a similar computer processor architecture as that of a personal computer, tablet computer, mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computing system 1100.

While the main memory 1106, non-volatile memory 1110, and storage medium 1126 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 1128. The term "machine-readable medium" and "storage medium" shall also be taken to include any medium that is capable of storing, encoding, or carrying a set of instructions for execution by the computing system 1100.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 1104, 1108, 1128) set at various times in various memory and storage devices in a computing device. When read and executed by the one or more processors 1102, the instruction(s) cause the computing system 1100 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 1110, floppy and other removable disks, hard disk drives, optical disks (e.g., Compact Disk Read-Only Memory (CD-ROMS), Digital Versatile Disks (DVDs)), and transmission-type media such as digital and analog communication links.

The network adapter 1112 enables the computing system 1100 to mediate data in a network 1114 with an entity that is external to the computing system 1100 through any communication protocol supported by the computing system 1100 and the external entity. The network adapter 1112 can include a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 1112 may include a firewall that governs and/or manages permission to access/proxy data in a computer network and tracks varying levels of trust between different machines and/or applications. The firewall can be any number of modules having any combination of components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

REMARKS

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A computer-implemented method comprising:
    obtaining (i) a digital image comprised of pixels and (ii) an output indicative of an instance of an object detected in the digital image;
    encoding the output as a target vector;
    identifying a detection model associated with a class of which the object is a part,
        wherein upon being applied to digital images, the detection model detects instances of objects in the class;
    creating multiple masks in which different subsets of pixels are set to a value of zero;
    applying the multiple masks to the digital image to produce multiple masked digital images;
    applying the detection model to the multiple masked digital images to generate a series of outputs indicative of instances of objects in the class;
    encoding the series of outputs as a series of proposal vectors;
    establishing pairwise similarity between the target vector and the series of proposal vectors; and
    generating a visualization component based on the pairwise similarity between the target vector and the series of proposal vectors.

2. The computer-implemented method of claim 1, wherein said establishing comprises:
    computing pairwise similarity so that a similarity metric is produced for each proposal vector in the series of proposal vectors,
    associating each similarity metric with the masked digital image from which the corresponding proposal vector is derived, and
    assigning a highest similarity metric associated with each masked digital image to a corresponding mask as a weight metric.

3. The computer-implemented method of claim 2, wherein said generating comprises:
    computing a weighted sum of the multiple masks to obtain a saliency matrix, and
    creating, based on the saliency matrix, the visualization component in which salient pixels that influence the output are visually identifiable.

4. The computer-implemented method of claim 3, wherein the saliency matrix includes a single value corresponding to each pixel in the digital image.

5. The computer-implemented method of claim 1, further comprising:
causing display of the visualization component on an interface.

6. The computer-implemented method of claim 1, further comprising:
creating a modified digital image by altering hue, intensity, or color format of the digital image; and
causing display of the visualization component that overlays the modified digital image on an interface.

7. The computer-implemented method of claim 1, wherein the output corresponds to a region of pixels in the digital image, and wherein each output in the series of outputs corresponds to a region of pixels in one of the multiple masked digital images.

8. The computer-implemented method of claim 1, wherein the target vector includes (i) localization information defining a region of pixels that contains the object and (ii) classification information indicative of a probability that the region of pixels contains the object.

9. The computer-implemented method of claim 8, wherein each proposal vector includes (i) localization information defining a region of pixels that contains the object and (ii) classification information indicative of a probability that the region of pixels contains the object.

10. The computer-implemented method of claim 9, wherein said establishing comprises:
measuring spatial similarity by comparing the localization information in the target vector to the localization information in each proposal vector of the series of proposal vectors,
evaluating classification similarity by comparing the classification information in the target vector to the classification information in each proposal vector of the series of proposal vectors, and
producing a similarity metric for each proposal vector in the series of proposal vectors based on the spatial and classification similarity with the target vector.

11. The computer-implemented method of claim 1, wherein multiple outputs in the series of outputs correspond to a single masked digital image of the multiple masked digital images.

12. A system comprising:
a memory storing a digital image comprised of pixels; and
at least one processor configured to cause the system to:
obtain (i) the digital image and (ii) an output indicative of an instance of an object detected in the digital image;
encode the output as a target vector;
identify a detection model associated with a class of which the object is a part,
wherein upon being applied to digital images, the detection model detects instances of objects in the class;
create multiple masks in which different subsets of pixels are set to a value of zero;
apply the multiple masks to the digital image to produce multiple masked digital images;
apply the detection model to the multiple masked digital images to generate a series of outputs, indicative of instances of objects in the class;
encode the series of outputs as a series of proposal vectors;
establish pairwise similarity between the target vector and the series of proposal vectors; and
generate a visualization component based on the pairwise similarity between the target vector and the series of proposal vectors.

13. The system of claim 12, wherein the detection model is designed to detect objects in a single class.

14. The system of claim 12, wherein upon being applied, the detection model employs a neural network with a one-stage architectural design.

15. The system of claim 12, wherein upon being applied, the detection model employs a neural network with a two-stage architectural design.

16. The system of claim 12, wherein the at least one processor is further configured to cause the system to:
create the multiple masks by—
sampling a predetermined number of binary masks by independently assigning each pixel a value with a given probability and a value of zero otherwise,
upsampling the predetermined number of binary masks using bilinear interpolation, and
shifting each unsampled mask by a random number of pixels in both spatial directions.

17. The system of claim 12, wherein the at least one processor is further configured to cause the system to:
encode the target vector to include (i) localization information defining a region of pixels and (ii) classification information indicative of a probability that the region of pixels contains the object; and
encode each proposal vector to include (i) localization information defining a region of pixels and (ii) classification information indicative of a probability that the region of pixels contains the object.

18. The system of claim 17, wherein the at least one processor is configured to establish pairwise similarity between the target vector and the series of proposal vectors by:
generating a similarity metric for each proposal vector by—
determining a degree of similarity between the localization information in the target vector and the localization information in the proposal vector, and
determining a degree of similarity between the classification information in the target vector and the classification information in the proposal vector.

19. A non-transitory computer-readable memory having instructions stored thereon that, when executed by a processor, cause the processor to perform operations comprising:
obtaining (i) a digital image comprised of pixels and (ii) an output indicative of an instance of an object detected in the digital image;
encoding the output as a target vector;
identifying a detection model associated with a class of which the object is a part,
wherein upon being applied to digital images, the detection model detects instances of objects in the class;
creating multiple masks in which different subsets of pixels are set to a value of zero;
applying the multiple masks to the digital image to produce multiple masked digital images;
applying the detection model to the multiple masked digital images to generate a series of outputs indicative of instances of objects in the class;
encoding the series of outputs as a series of proposal vectors;
establishing pairwise similarity between the target vector and the series of proposal vectors; and
generating a visualization component based on the pairwise similarity between the target vector and the series of proposal vectors.

20. The non-transitory computer-readable medium of claim 19, wherein the operations further comprise:
  associating each similarity metric with the masked digital image from which the corresponding output is derived;
  assigning a highest similarity metric associated with each masked digital image to a corresponding mask in the series of masks as a weight metric;
  computing a weighted sum of the series of masks to obtain a saliency matrix in which each value corresponds to a pixel in the digital image;
  establishing importance of each pixel in the digital image by comparing the corresponding value in the saliency matrix to defined ranges of values; and
  assigning a color to each pixel based on the defined range of values in which the corresponding value is included.

* * * * *